United States Patent
Ueki et al.

(10) Patent No.: US 9,219,292 B2
(45) Date of Patent: Dec. 22, 2015

(54) NONAQUEOUS ELECTROLYTE SECONDARY BATTERY

(75) Inventors: Tomoyoshi Ueki, Toyota (JP); Yukihiro Okada, Shijyonawate (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 50 days.

(21) Appl. No.: 14/342,078

(22) PCT Filed: Sep. 1, 2011

(86) PCT No.: PCT/JP2011/069962
§ 371 (c)(1),
(2), (4) Date: Feb. 28, 2014

(87) PCT Pub. No.: WO2013/031012
PCT Pub. Date: Mar. 7, 2013

(65) Prior Publication Data
US 2014/0220402 A1 Aug. 7, 2014

(51) Int. Cl.
| H01M 2/16 | (2006.01) |
| H01M 2/18 | (2006.01) |
| H01M 2/14 | (2006.01) |
| H01M 10/42 | (2006.01) |

(52) U.S. Cl.
CPC ............ *H01M 10/4235* (2013.01); *H01M 2/16* (2013.01); *H01M 2/166* (2013.01); *H01M 2/1686* (2013.01); *H01M 2/18* (2013.01)

(58) Field of Classification Search
None
See application file for complete search history.

(56) References Cited

U.S. PATENT DOCUMENTS

| 2008/0241697 | A1 | 10/2008 | Imachi | |
| 2009/0178969 | A1* | 7/2009 | Hanakawa et al. | 210/321.6 |
| 2009/0317721 | A1 | 12/2009 | Shirane et al. | |
| 2012/0156568 | A1* | 6/2012 | Kia et al. | 429/246 |
| 2013/0052450 | A1* | 2/2013 | Miyauchi et al. | 428/310.5 |

FOREIGN PATENT DOCUMENTS

| CN | 101346850 | 1/2009 |
| JP | 2001-43842 | 2/2001 |

* cited by examiner

*Primary Examiner* — Cynthia K Walls
(74) *Attorney, Agent, or Firm* — Finnegan, Henderson, Farabow, Garrett & Dunner, LLP (57) ABSTRACT

The nonaqueous electrolyte secondary battery 100 according to the present invention is provided with a wound electrode assembly in which a positive electrode sheet and a negative electrode sheet are wound, with a porous separator sheet 30 interposed therebetween. A filler layer 40 comprising an inorganic filler and a binder is formed on one side of the separator sheet 30. The filler layer 40 is continuously provided from the winding start end 38A to the winding finish end 38B of the separator sheet 30 in the winding direction of this sheet. The separator sheet 30 has low porosity regions 36A, 36B, which have a lower porosity than a location 35 outside these regions, in regions having prescribed width $W_A$, $W_B$ from the winding start end 38A and/or the winding finish end 38B of the sheet toward the center of the sheet.

8 Claims, 7 Drawing Sheets

WINDING START END SIDE ⟷ WINDING FINISH END SIDE
WINDING DIRECTION

WINDING START END SIDE ⇔ WINDING FINISH END SIDE
WINDING DIRECTION

NONAQUEOUS ELECTROLYTE SECONDARY BATTERY

CROSS-REFERENCE TO RELATED APPLICATIONS

This application is a national phase application of International Application No. PCT/JP2011/069962, filed Sep. 1, 2011, the content of which is incorporated herein by reference.

TECHNICAL FIELD

The present invention relates to a nonaqueous electrolyte secondary battery and more particularly relates to a nonaqueous electrolyte secondary battery in which a filler layer is provided on one side of a separator.

BACKGROUND ART

Lithium secondary batteries, nickel hydride batteries, and other secondary batteries have in recent years entered into use as vehicle-mounted power sources and as power sources for personal computers and portable and mobile electronic devices. In particular, the importance of lithium secondary batteries, which are light and provide a high energy density, as high-output vehicular power sources is growing. A typical configuration for this type of lithium secondary battery is provided with an electrode assembly having a structure in which sheet-shaped electrodes are wound into a spiral shape (wound electrode assembly). To form this wound electrode assembly, for example, a positive electrode sheet having a structure in which a positive electrode active material layer containing a positive electrode active material is supported on both sides of a positive electrode current collector and a negative electrode sheet having a structure in which a negative electrode active material layer containing a negative electrode active material is supported on both sides of a negative electrode current collector are wound into a spiral configuration with a separator sheet interposed therebetween.

A porous resin sheet comprising, e.g., polyethylene (PE) and/or polypropylene (PP), has been used as the separator sheet. This separator sheet, being porous, undergoes heat shrinkage when the temperature becomes elevated. This is used to generate a shutdown function. However, when a large heat shrinkage occurs, localized short circuiting is produced by, for example, film rupture, and additional short circuiting can spread from that location. The formation of a filler layer (porous heat-resistant layer) on the surface of the separator sheet has thus been proposed in order to prevent heat shrinkage by the separator sheet (for example, Patent Literature 1).

CITATION LIST

Patent Literature

Patent Literature 1: Japanese Patent Application Laid-open No. 2001-043842

SUMMARY OF INVENTION

Figure 9:
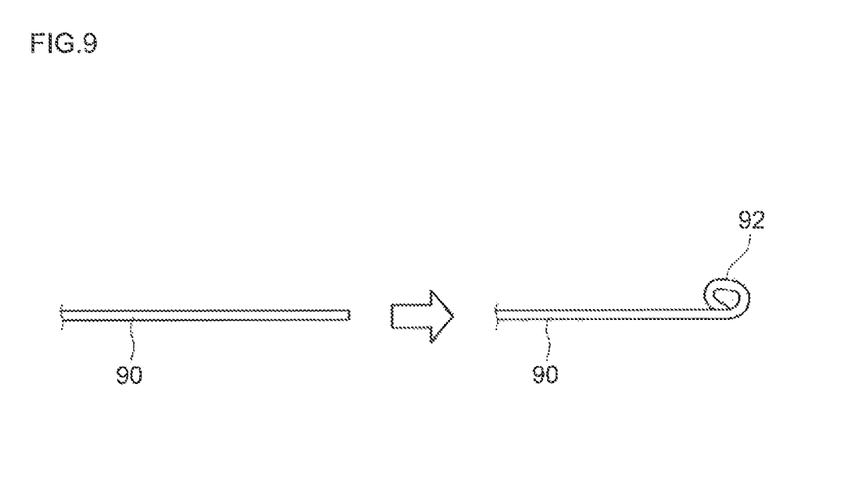
FIG. 9 is a diagram that schematically illustrates a conventional separator sheet.
Figure 10:
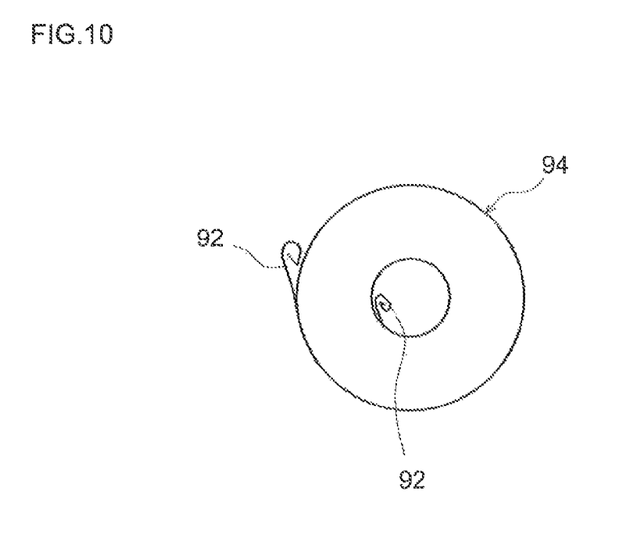
FIG. 10 is a diagram that schematically illustrates a conventional wound electrode assembly.

However, separator sheets tend to readily undergo extension and contraction while filler layers tend to be resistant to extension and contraction. As a consequence, when a filler layer is disposed on only one side of a separator sheet 90, as shown in FIGS. 9 and 10 the end of the separator sheet 90 curls up—due to differences in extension/contraction between the separator sheet 90 and the filler layer—when the environment, e.g., the thermal environment or humidity, undergoes a change, and a curl (curvature deformation) 92 is then produced at the innermost peripheral surface and the outermost peripheral surface of a wound electrode assembly 94. This curl 92 lowers the insertability during insertion of the wound electrode assembly 94 into the battery case and during insertion of the winding core into the electrode assembly 94, and thus can cause production defects.

Figure 11:
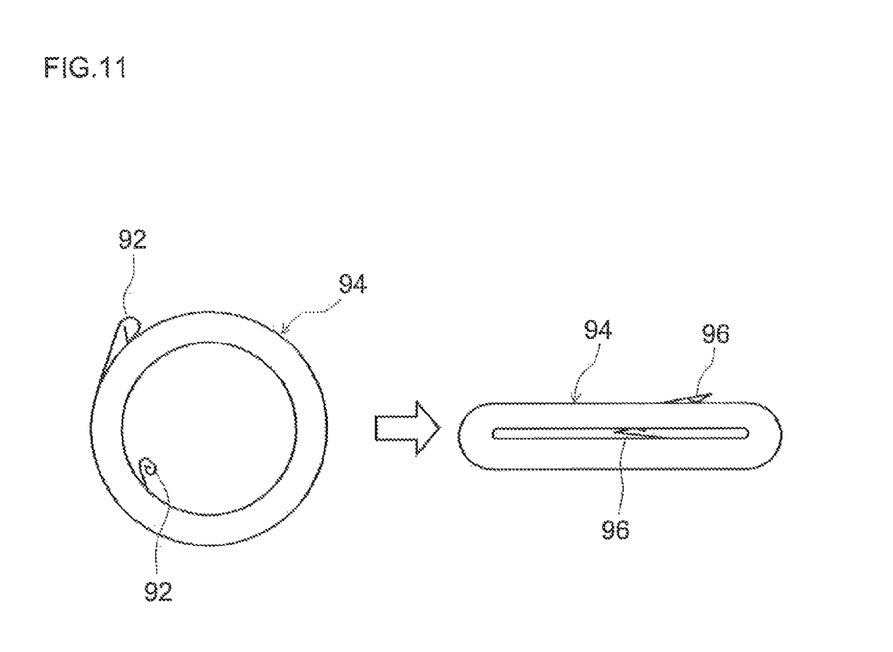
FIG. 11 is a diagram that schematically illustrates a conventional flat wound electrode assembly.

Moreover, when a flat wound electrode assembly is fabricated by pressing the wound electrode assembly 94 into a flat shape, as shown in FIG. 11 the curl region 92 is crimped by this pressing and a height difference 96 may be formed at the innermost peripheral surface and the outermost peripheral surface of the wound electrode assembly 94. When such a height difference 96 is produced, the pressure (surface pressure) received by the wound electrode assembly 94 due to the restraining load (for example, the restraining load applied in order to prevent the battery from swelling) may differ between the height difference 96 and its surrounding areas. Nonuniformity in this loading pressure is unfavorable because it can produce nonuniformity in the intensity of the pressure within the winding, which in turn can produce nonuniformity in the distribution of the battery constituent components, e.g., the electrolyte and so forth, within the winding, and as a result may exacerbate the cycle characteristics of the battery. An object of the present invention is to solve this problem.

The nonaqueous electrolyte secondary battery according to the present invention is a nonaqueous electrolyte secondary battery provided with a wound electrode assembly (preferably in a flattened configuration) in which a positive electrode sheet and a negative electrode sheet are wound, with a porous separator sheet interposed therebetween. A filler layer having an inorganic filler and a binder is formed on one surface of this separator sheet. The filler layer is continuously disposed from a winding start end to a winding finish end of the sheet in the winding direction of the separator sheet. This separator sheet has a low porosity region, which has a porosity lower than at a location outside this region, in a region leaving a prescribed width from the winding start end and/or from the winding finish end of the sheet toward the center of the sheet.

Due to the formation according to the present invention of a low porosity region in the region having a prescribed width from the winding start end and/or from the winding finish end of the separator sheet toward the center of the sheet, the separator sheet exhibits a low degree of extension/contraction in this low porosity region, and there is thus little difference in extension/contraction between the separator sheet and the filler layer even when the environment, e.g., the thermal environment, the humidity, and so forth, changes. Due to this, the stress that causes curling (curvature deformation) and that originates at this end is relaxed and the generation of curling in the separator sheet is suppressed. The use of such a separator sheet makes possible the fabrication of a high-performance nonaqueous electrolyte secondary battery in which the various defects caused by curling are extinguished.

In a preferred embodiment of the herein disclosed nonaqueous electrolyte secondary battery, the low porosity region is formed by compression of the region having a prescribed width from the end of the separator sheet. The low porosity region can be easily formed using such an implementation. Or, the low porosity region may be formed by filling the pores in the separator sheet with a resin.

In a preferred embodiment of the herein disclosed nonaqueous electrolyte secondary battery, the porosity reduction percentage X given by $X=[(H2-H1)/H2]\times 100$ satisfies $5 \leq X \leq 90$ where H1 is the porosity of the low porosity region of the separator sheet and H2 is the porosity at a location outside this region. When this porosity reduction percentage X is too small, the curling inhibition effect described above may not be obtained to a satisfactory degree. When, on the other hand, the porosity reduction percentage X is too large, this is almost without benefit due to a reduction in the curling inhibition effect, and, in addition, due to a reduction in the flexibility in the region neighboring the end of the separator sheet, defects such as winding defects may be produced when the separator sheet is wound during fabrication of the wound electrode assembly.

The width of the low porosity region is 2 mm to 40 mm in a preferred embodiment of the herein described nonaqueous electrolyte secondary battery. A satisfactory expression of the curling inhibition effect can be obtained by having the width over which the low porosity region is disposed be at least 2 mm (preferably at least 5 mm and more preferably at least 10 mm). When, on the other hand, the low porosity region is too wide, the cost may be increased due to an increase in the unproductive part of the separator sheet. Viewed in terms of cost reduction, not more than about 40 mm is favorable and, for example, not more than 30 mm is particularly preferred.

The thickness of the filler layer is not more than 5 μm in a preferred embodiment of the herein disclosed nonaqueous electrolyte secondary battery. A filler layer thickness of not more than 5 μm is advantageous with regard to increasing the ionic permeability of the filler layer. On the other hand, the shape retention force due to the filler layer is reduced in this configuration and the separator sheet is then quite susceptible to curling. Thus, the effect generated by the structure of the present invention, i.e., an inhibition of curling through the disposition of a low porosity region in a region having a prescribed width from the end of the separator sheet, can be manifested particularly well when the thickness of the filler layer is not more than 5 μm.

The material of the inorganic filler is not particularly limited, but preferably comprises at least one inorganic compound selected from the group consisting of alumina, magnesia, zirconia, silica, boehmite, and titania. These inorganic compounds are preferably used as inorganic fillers (typically particulates) adapted to the objects of the present invention since they have high melting points and excellent heat resistances.

The filler layer-bearing separator sheet has the following property in a preferred embodiment of the herein described nonaqueous electrolyte secondary battery: when the low porosity region of the separator sheet is cut off and removed and the separator sheet is then held for one hour on a horizontal surface, the curl angle, defined as the angle formed between the horizontal surface and the trajectory described by the tip of the cut end of the sheet that has risen up from the horizontal surface, is at least 90°. A separator sheet having this property is quite prone to curling and the application of the present invention to such a separator sheet is therefore of particular significance.

All of the herein disclosed nonaqueous electrolyte secondary batteries, because they exhibit little curling and thus exhibit an excellent battery performance (for example, cycle characteristics), are well suited, for example, as vehicle-mounted nonaqueous electrolyte secondary batteries (for example, lithium secondary batteries), for example, in automobiles. Accordingly, the present invention can provide a vehicle (for example, an automobile) in which the nonaqueous electrolyte secondary battery (possibly configured as a battery pack in which a plurality of the nonaqueous electrolyte secondary batteries are connected) is mounted as a power source (typically a power source for a hybrid vehicle or an electric vehicle).

DESCRIPTION OF EMBODIMENTS

Embodiments according to the present invention are described in the following with reference to the drawings. In the following description of the drawings, members and positions that exercise the same function are assigned the same reference symbol. The dimensional relationships (length, width, thickness, and so forth) in the individual drawings do not reflect actual dimensional relationships. Moreover, matters required for the execution of the present invention but not particularly described in this Description (for example, methods for producing the positive electrode active material and the negative electrode active material, the structure and production of the separator and electrolyte, and general technology related to the fabrication of nonaqueous electrolyte secondary batteries) can be understood as design matters for the individual skilled in the art based on the conventional art in the pertinent field.

The present invention is described in detail in the following using the example of a lithium secondary battery having a configuration in which a nonaqueous electrolyte and an electrode assembly that has been wound (a wound electrode assembly) are housed in a rectangular battery case, but this is not intended as a particular limitation.

<The Lithium Secondary Battery>

The structure of the lithium secondary battery according to an embodiment of the present invention is schematically illustrated in FIGS. 1 to 4. This lithium secondary battery 100 has a structure in which an electrode assembly (wound electrode assembly) 80—comprising a long positive electrode sheet 10 and a long negative electrode sheet 20 that have been stacked and wound with a long separator sheet 30 interposed therebetween—is housed with a nonaqueous electrolyte (not shown) in a battery case 50 that has a shape (box shape) that can accommodate the wound electrode assembly 80.

Figure 1:
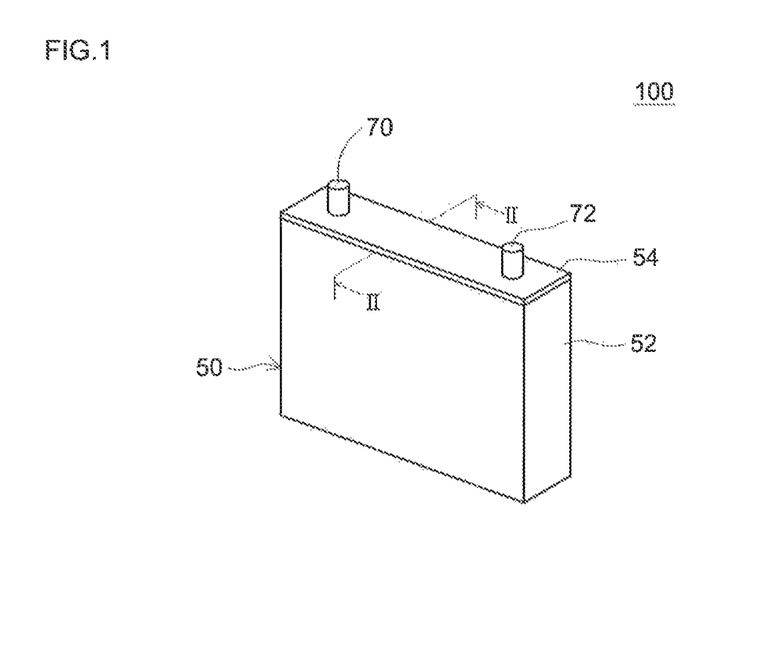
FIG. 1 is a side view that schematically shows a nonaqueous electrolyte secondary battery according to an embodiment of the present invention.
Figure 2:
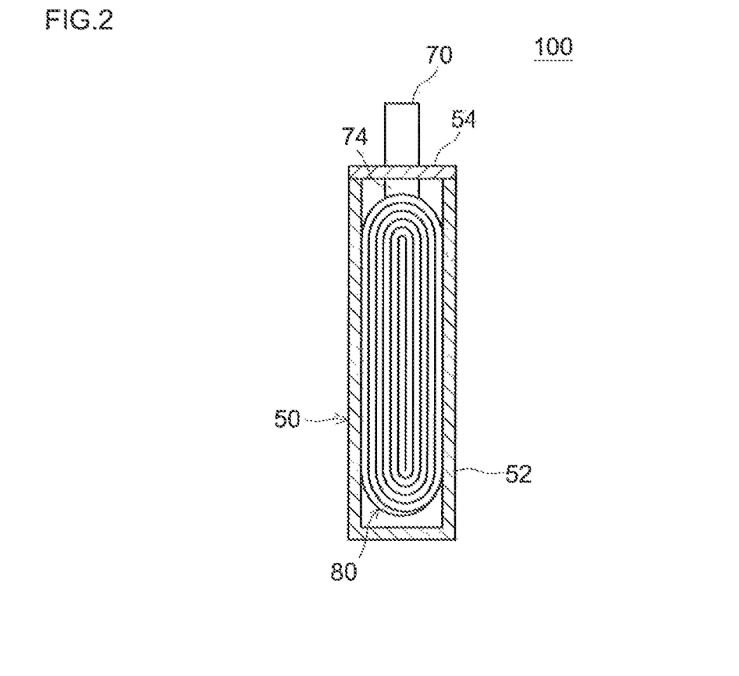
FIG. 2 is a cross-sectional drawing at the II-II line in FIG. 1.

The battery case 50 is provided with a box-shaped case main body 52 that has an open upper end and with a lid 54 that closes this opening. A metal such as aluminum, steel, Ni-plated SUS, and so forth, is preferably used as the material constituting the battery case 50. Or, this may be a battery case 50 made by molding a resin such as PPS, polyimide resin, and so forth. A positive electrode terminal 70 that electrically connects to the positive electrode 10 of the wound electrode assembly 80 and a negative electrode terminal 72 that electrically connects to the negative electrode 20 of the wound electrode assembly 80 are disposed in the upper side (that is, the lid 54) of the battery case 50. The wound electrode assembly 80 is housed in combination with a nonaqueous electrolyte (not shown) within the battery case 50.

<The Wound Electrode Assembly>

Figure 3:
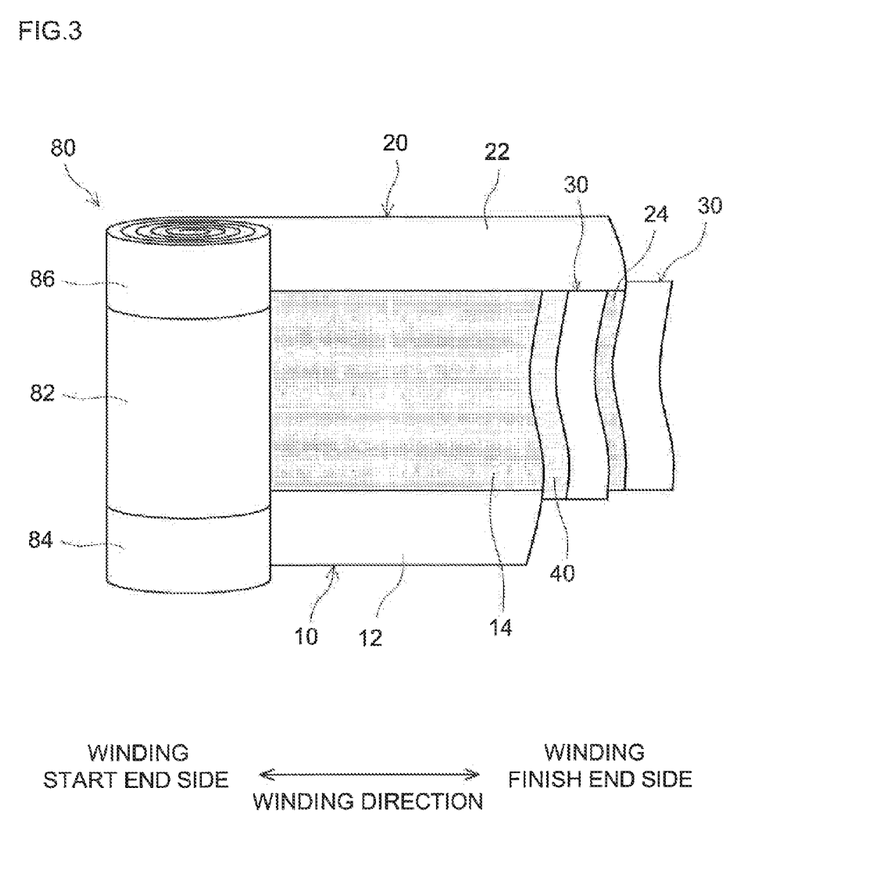
FIG. 3 is a schematic diagram for describing a wound electrode assembly used in a nonaqueous electrolyte secondary battery according to an embodiment of the present invention.

The wound electrode assembly 80 according to this embodiment is the same as the wound electrode assembly in an ordinary lithium secondary battery, except for the structure of the separator sheet 30, vide infra, and, as shown in FIG. 3, it has a long sheet structure (sheet-shaped electrode assembly) in the stage prior to the assembly of the wound electrode assembly 80.

The positive electrode sheet 10 has a structure in which a positive electrode active material layer 14 comprising a positive electrode active material is supported on both sides of a long sheet-shaped positive electrode current collector 12 foil. However, the positive electrode active material layer 14 is not present at one side edge (the lower edge region in the figure) along a margin, in the width direction, of the positive electrode sheet 10, thus forming a positive electrode active material layer-free region where the positive electrode current collector 12 is exposed over a prescribed width.

Like the positive electrode sheet 10, the negative electrode sheet 20 also has a structure in which a negative electrode active material layer 24 comprising a negative electrode active material is supported on both sides of a long sheet-shaped negative electrode current collector 22 foil. However, the negative electrode active material layer 24 is not present at one side edge (the upper edge region in the figure) along a margin, in the width direction, of the negative electrode sheet 20, thus forming a negative electrode active material layer-free region where the negative electrode current collector 22 is exposed over a prescribed width.

During the fabrication of the wound electrode assembly 80, a sheet-shaped electrode assembly is fabricated by, as shown in FIG. 3, stacking a positive electrode sheet 10 with a negative electrode sheet 20 with two separator sheets 30 interposed therebetween. When this is done, stacking is carried out with the positive electrode sheet 10 and the negative electrode sheet 20 shifted somewhat in the width direction so the positive electrode active material layer-free region on the positive electrode sheet 10 and the negative electrode active material layer-free region on the negative electrode sheet 20 extend, respectively, from the two sides, in the width direction, of the separator sheet 30. The sheet-shaped electrode assembly fabricated by this stacking can be wound to fabricate the wound electrode assembly 80.

Figure 4:
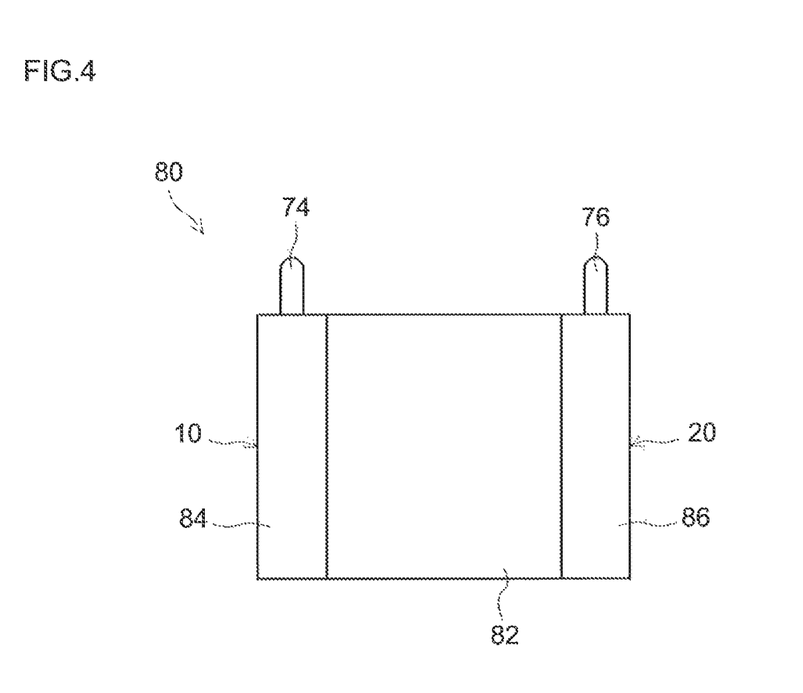
FIG. 4 is a diagram that schematically illustrates a wound electrode assembly used in a nonaqueous electrolyte secondary battery according to an embodiment of the present invention.

A wound core region 82 (i.e., the region where the positive electrode active material layer 14 of the positive electrode sheet 10, the negative electrode active material layer 24 of the negative electrode sheet 20, and the separator sheet 30 are densely layered) is formed in the central region in the direction of the winding axis of the wound electrode assembly 80. In addition, the electrode active material layer-free regions on the positive electrode sheet 10 and the negative electrode sheet 20 extend to the outside from the wound core region 82, respectively, at the two edges in the direction of the winding axis of the wound electrode assembly 80. A positive electrode lead terminal 74 and a negative electrode lead terminal 76 are attached, respectively, to the protruding region (i.e., the region where the positive electrode active material layer 14 is not formed) 84 on the positive electrode side and to the protruding region (i.e., the region where the negative electrode active material layer 24 is not formed) 86 on the negative electrode side and are electrically connected to, respectively, the positive electrode terminal 70 and the negative electrode terminal 72.

<The Positive Electrode Sheet>

Except for the separator sheet 30, the structural elements constituting the wound electrode assembly 80 may be the same as for the wound electrode assembly in a conventional lithium secondary battery and are not particularly limited. For example, the positive electrode sheet 10 can be formed by attaching, on a long positive electrode current collector 12, a positive electrode active material layer 14 having as its major component a positive electrode active material for application in lithium secondary batteries. An aluminum foil or other metal foil suitable for application in a positive electrode is favorably used for the positive electrode current collector 12. One or two or more of the substances heretofore used in lithium ion batteries may be used without particular limitation as the positive electrode active material. Positive electrode active materials in which the major component is an oxide containing lithium and a transition metal element as its constituent metal elements (a lithium transition metal oxide), e.g., lithium nickel oxides (for example, $LiNiO_2$), lithium cobalt oxides (for example, $LiCoO_2$), and lithium manganese oxides (for example, $LiMn_2O_4$), are preferred examples for application of the herein disclosed technology.

<The Negative Electrode Sheet>

The negative electrode sheet 20 can be formed by attaching, on a long negative electrode current collector 22, a negative electrode active material layer 24 having as its major component a negative electrode active material for application in lithium secondary batteries. A copper foil or other metal foil suitable for application in a negative electrode is favorably used for the negative electrode current collector 22. One or two or more of the substances heretofore used in lithium secondary batteries can be used without particular limitation as the negative electrode active material. Favorable examples are carbonaceous materials such as graphite carbon and amorphous carbon, lithium-containing transition metal oxides, and lithium-containing transition metal nitrides.

<The Separator Sheet>

For example, a polyolefin-type resin, e.g., polyethylene (PE), polypropylene (PP), and so forth, can be favorably used as the material of the separator sheet 30 that is used between the positive electrode sheet 10 and the negative electrode sheet 20. The structure of the separator sheet 30 may be a monolayer structure or a multilayer structure. The separator sheet 30 is constituted of a PE-based resin in the present instance. An ethylene homopolymer is preferably used as this PE-based resin. In addition, this PE-based resin may be a resin that contains at least 50 mass % repeat units derived from ethylene, or a copolymer provided by the polymerization of ethylene with a copolymerizable α-olefin, or a copolymer provided by the polymerization of ethylene with at least one copolymerizable monomer. The α-olefin can be exemplified by propylene. The other monomer can be exemplified by conjugated dienes (for example, butadiene), acrylic acid, and so forth.

The separator sheet 30 is preferably composed of a PE that has a shutdown temperature of approximately 120° C. to 140° C. (typically 125° C. to 135° C.). This shutdown temperature is well below the heat-resistance temperature (for example, at least approximately 200° C.) of the battery. This PE can be generally exemplified by the polyolefins known as high-density polyethylene, straight-chain (linear) low-density polyethylene, and so forth. Or, the various branched medium-density and low-density polyethylenes may be used. As necessary, various additives, e.g., plasticizers, antioxidants, and so forth, may also be incorporated.

A monoaxially stretched or biaxially stretched porous resin sheet can favorably be used for the separator sheet 30. Of these, a porous resin sheet that has been monoaxially stretched in the length direction (machine direction or MD) is particularly preferred because it exhibits little heat shrinkage in the width direction while providing a satisfactory strength. For example, when a separator sheet is used that has such a resin sheet that has been monoaxially stretched in the length direction, the heat shrinkage in the length direction can also be suppressed in the configuration in which it is wound with a long sheet-shaped positive electrode and negative electrode. Accordingly, a porous resin sheet that has been monoaxially stretched in the length direction is a particularly favorable material for the separator sheet that is a constituent of the wound electrode assembly under consideration.

The thickness of the separator sheet 30 is preferably approximately 10 µm to 30 µm and is more preferably approximately 15 µm to 25 µm. The ionic permeability of the separator sheet 30 may be reduced when the separator sheet 30 is too thick. On the other hand, film rupture may occur when the separator sheet 30 is too thin. The thickness of the separator sheet 30 can be determined by carrying out image analysis on an image obtained by photography using a scanning electron microscope (SEM).

The separator sheet 30 may have a single layer structure that uses a PE layer or may be a separator sheet that has a multilayer structure. For example, it may have a three layer structure of a PP layer, a PE layer laminated on this PP layer, and a PP layer laminated on the PE layer. In this case, the filler layer 40 can be layered on either of the PP layers. The number of layers in a separator sheet having a multilayer structure is not limited to 3 and may be 2 or 4 or more.

As shown in FIG. 3, a filler layer 40 is formed in this embodiment on one side of the separator sheet 30 present in the wound electrode assembly. The filler layer 40 is formed in the length direction (winding direction) of the separator sheet 30. In this embodiment, the filler layer 40 is disposed at the interface between the positive electrode sheet 10 and the separator sheet 30. This filler layer 40 comprises an inorganic filler (typically a particulate) and a binder. The binder functions to anchor the inorganic filler to the surface of the separator sheet 30 and also to induce cohesion within the inorganic filler. A plurality of voids is formed between neighboring inorganic filler elements at those locations where the binder is not bonded. Li ion movement between the two electrodes 10, 20 can be secured and a satisfactory battery output can be obtained by causing a nonaqueous electrolyte (a nonaqueous electrolyte solution in this case) to be held in these voids (by impregnating the filler layer 40 with the nonaqueous electrolyte solution).

The inorganic filler constituent of the filler layer is preferably a material that has a high electrical insulating character and a melting point above that of the separator sheet 30. This material can be, for example, a metal oxide, metal hydroxide, metal nitride, and so forth. The form of the inorganic material can be, for example, particulate, fibrous, or flake. The use of a particulate inorganic material is generally preferred. Particles of an inorganic oxide or an inorganic hydroxide can be favorably used. Examples here are alumina, boehmite, magnesia, titania, silica, and zirconia. Alumina, boehmite, magnesia, and titania are particularly preferred inorganic compounds. A single one of these inorganic compounds may be used by itself or two or more may be used in combination. The use of these inorganic compounds can favorably secure the heat resistance and mechanical strength. The volume-based average particle diameter (D50) of the inorganic compound based on a laser diffraction scattering methodology can be, for example, approximately 0.1 µm to 1 µm.

The binder used in the filler layer is used to bond the inorganic filler, and various materials can be broadly used without particular limitation for the material itself that constitutes the binder. For example, when the filler layer-forming paint is an aqueous solvent (a solution in which the dispersing medium for the binder is water or a mixed solvent in which the major component is water), a polymer that can undergo dispersion or dissolution in aqueous solvents can be used. Acrylic resins are an example of polymers capable of dispersing or dissolving in aqueous solvents. Homopolymers provided by the polymerization of a single monomer, e.g., acrylic acid, methacrylic acid, acrylamide, methacrylamide, 2-hydroxyethyl acrylate, 2-hydroxyethyl methacrylate, methyl methacrylate, ethylhexyl acrylate, butyl acrylate, and so forth, are preferably used as this acrylic resin. The acrylic resin may also be a copolymer provided by the polymerization of two or more of the aforementioned monomers. It may also be a mixture of two or more selections from these homopolymers and copolymers. In addition to these acrylic resins, for example, styrene-butadiene rubbers (SBR), polyolefin resins such as polyethylene (PE), and polytetrafluoroethylene (PTFE) may also be used. A single one of these polymers may be used by itself or a combination of two or more may be used. The use of an acrylic resin among the preceding is preferred. The form of the binder is not particularly limited, and a particulate (powder) may be used as such or a binder formulated as a solution or emulsion may be used. When two or more binders are used, they may each take a different form.

The filler layer 40 may as necessary contain a material or materials other than the previously described inorganic filler and binder. This material can be exemplified by the various polymer materials that can function as a thickener for the filler layer-forming paint, infra. In the particular case of use of an aqueous solvent, a polymer that functions as such a thickener is preferably incorporated. Carboxymethyl cellulose (CMC) and methyl cellulose (MC) are preferably used as this polymer that functions as such a thickener.

Although not intended as a particular limitation, the proportion of the inorganic filler in the filler layer as a whole is suitably at least about 50 mass % (for example, 50 mass % to 99 mass %) and is preferably at least 80 mass % (for example, 80 mass % to 99 mass %) and is particularly preferably about 90 mass % to 99 mass %. In addition, the proportion of the binder in the filler layer 40 is suitably not more than about 40 mass % and is preferably not more than 10 mass % and is particularly preferably not more than 5 mass % (for example, about 0.5 mass % to 3 mass %). When a filler layer-forming component other than the inorganic filler and binder is present, for example, when a thickener is present, the content of this thickener is preferably not more than about 3 mass % and preferably not more than about 2 mass % (for example, about 0.5 mass % to 1 mass %).

The thickness of the filler layer 40 is preferably about 0.5 µm to 10 µm and more preferably about 0.5 µm to 5 µm. The ionic permeability of the filler layer 40 is at risk for declining when the filler layer 40 is too thick. When, on the other hand, the filler layer 40 is too thin, the strength (shape retention) may decline and film rupture may occur. The thickness of the filler layer 40 can be determined by carrying out image analysis on an image obtained by photography using a scanning electron microscope (SEM).

The porosity of the filler layer 40 is preferably generally about 40% to 70% and, for example, is more preferably about 50% to 60%. When the porosity of the filler layer 40 is too large, the strength may be unsatisfactory and there is a risk that film rupture may readily occur. When, on the other hand, the porosity of the filler layer 40 is too low, only a small amount of electrolyte solution can be held in the filler layer 40 and the ionic permeability may then decline.

Figure 5:
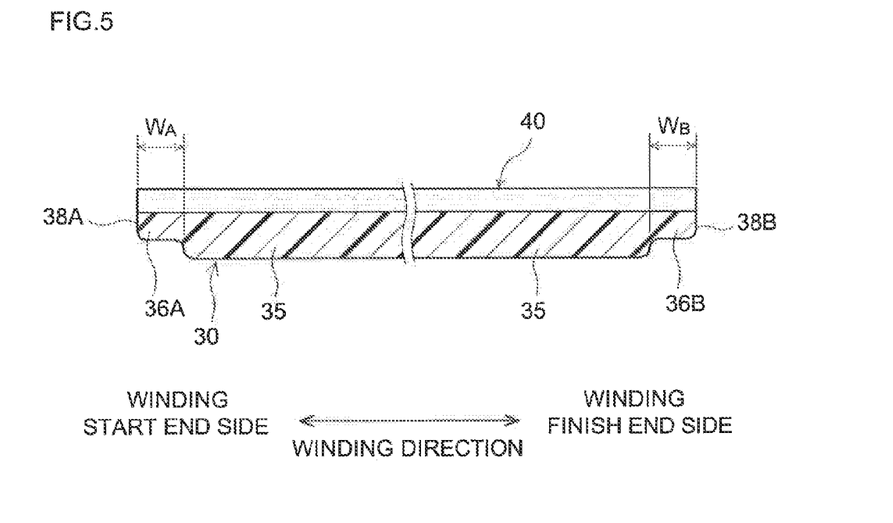
FIG. 5 is a cross-sectional diagram that schematically illustrates a separator sheet used in a nonaqueous electrolyte secondary battery according to an embodiment of the present invention.
Figure 6:
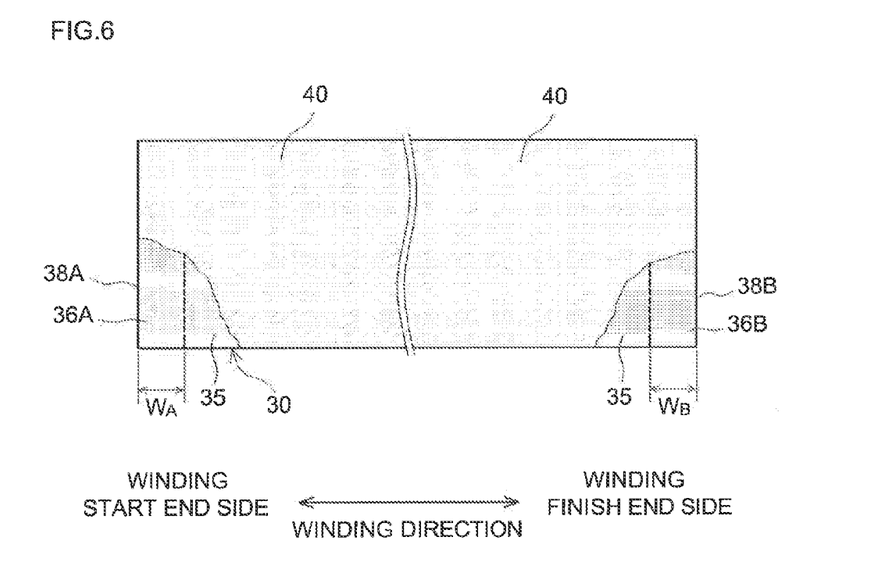
FIG. 6 is a top view of FIG. 5.

The separator sheet 30 according to this embodiment will now be described in detail with the addition of FIGS. 5 and 6. FIG. 5 is a schematic cross-sectional diagram that shows, in an enlarged view, a part of the cross section running in the length direction (winding direction) of the long separator sheet 30 as it resides in the stage prior to production of the wound electrode assembly, and shows a separator sheet 30 and a filler layer 40 disposed on one side of this separator sheet 30. FIG. 6 is a top view of FIG. 5. The left side in these figures is the winding start end side (winding center side) and the right side is the winding finish end side (winding outer periphery side).

As shown in FIG. 5, the filler layer 40 is formed extending in the winding direction (length direction) of the separator sheet 30. The filler layer 40 is continuously disposed in the winding direction of the separator sheet 30 from the winding start end 38A of this sheet to its winding finish end 38B. The separator sheet 30 has, in regions of prescribed widths $W_A$ and $W_B$ that run toward the sheet center from the winding start end 38A and the winding finish end 38B, low porosity regions 36A, 36B having a porosity lower than that of a location (typically the central region of the separator sheet in the winding direction) 35 outside these regions. These low porosity regions 36A, 36B are formed, for example, by hot compression (pressing) of the regions of prescribed width from the winding start end 38A and the winding finish end 38B of the separator sheet.

Due to the formation, according to this structure, of the low porosity regions 36A, 36B in the regions of prescribed width $W_A$, $W_B$ that are directed toward the sheet center from the winding start end 38A and the winding finish end 38B of the separator sheet 30, in these low porosity regions 36A, 36B, the separator sheet 30 exhibits little extension/contraction and thus there is little difference in extension/contraction between the separator sheet 30 and the filler layer 40 even when the environment, e.g., the thermal environment or humidity, undergoes a change. Due to this, the stress that causes curling (curvature deformation) and that originates at these ends 38A, 38B is relaxed and the generation of curling in the separator sheet 30 can be suppressed. The use of such a separator sheet 30 thus makes possible the fabrication of a high-performance lithium secondary battery in which the various defects caused by curling are extinguished.

For example, this can prevent the reduction in insertability during insertion of the electrode assembly into the battery case and insertion of the winding core into the electrode assembly, as may occur when curling is produced at the innermost peripheral surface and the outermost peripheral surface of a wound electrode assembly 80 that is a wound electrode assembly 80 fabricated using a separator sheet 30 as in the conventional battery structure shown in FIGS. 10 and 11. Moreover, this can prevent the nonuniformity in the restraining load (surface pressure) as may occur when the wound electrode assembly is pressed into a flat configuration and a height difference is formed at the innermost peripheral surface and the outermost peripheral surface of the wound electrode assembly due to the crimping of the curl region. When nonuniformity in the restraining load (surface pressure) exists, the electrolyte (electrolyte solution) distribution becomes nonuniform in conformity to the nonuniformity in the intensity with which pressure is applied in the interior of the wound electrode assembly, and high load regions are then produced during charge/discharge and the cycle characteristics (life) may be reduced.

On the other hand, since, in accordance with the description hereabove, curling is not produced in the separator sheet 30 in the lithium secondary battery 100 according to the present embodiment even when the environment, e.g., the thermal environment or humidity, undergoes a change, height differences due to crimping of the curl region are then not formed at the innermost peripheral surface and the outermost peripheral surface of the wound electrode assembly and the surface pressure applied to the wound electrode assembly (flat surface) can be made uniform as a result. As a consequence, the defects due to nonuniformities in the restraining load (surface pressure) are not produced and excellent cycle characteristics, excellent output characteristics, and a long life can then be realized.

In the herein disclosed technology, the porosity reduction percentage X given by $X=[(H2-H1)/H2]\times 100$ preferably satisfies $5\leq X\leq 65$ where H1 [%] is the porosity of the low and particularly preferably satisfies $15\leq X\leq 65$ where H1 [%] is the porosity of the low porosity regions 36A, 36B of the separator sheet 30 and H2 [%] is the porosity at a location 35 outside these regions. When this porosity reduction percentage X is too small, it may not be possible to obtain the above-described curl-inhibiting effect to a satisfactory degree. A porosity reduction percentage X that is too large, on the other hand, offers no additional advantage due to a reduction in this curl-inhibiting effect and, due to a reduction in the flexibility of the region neighboring the separator sheet end, can also produce defects (e.g., winding defects) during fabrication of the wound electrode assembly when such a separator sheet 30 is wound. Viewed from the standpoint of the stable fabrication of the wound electrode assembly, $5\leq X\leq 90$ (particularly $5\leq X\leq 65$) is preferably satisfied. Low porosity regions in which this porosity reduction percentage X is from at least 10% to not more than 65% are favorable from the perspective of having the curl-inhibiting effect co-exist in good balance with the production stability.

There are no particular limitations on the porosity H1 in these low porosity regions, but it is preferably generally approximately 5% to 40% and is more preferably, for example, approximately 5% to 30%. Curling can be suitably stopped by having the porosity H1 be in this range. In addition, the porosity H2 at the location 35 other than the low porosity regions is preferably generally approximately 40% to 60% and, for example, is more preferably approximately 45% to 55%. When the porosity H2 at the location 35 outside the low porosity regions is too low, only a small amount of electrolyte solution can be held in the separator sheet 30 and the ionic permeability may then decline. When, on the other, the porosity H2 is too large, the separator sheet 30 may have an inadequate strength and film rupture may occur.

In favorable examples of the herein disclosed separator sheet, the porosity H1 in the low porosity regions is in the range from 5% to 40% and the porosity H2 in the region outside these regions is in the range from 40% to 60%, or the porosity H1 in the low porosity regions is 5% to 30% and the porosity H2 in the region outside these regions is 45% to 55%. The use of a separator sheet having such porosities H1, H2 makes it possible to favorably suppress the appearance of curling while maintaining an excellent ionic permeability.

The porosity H2 [%] of the separator sheet 30 (but excluding the low porosity regions) can be determined as follows. Letting Va [cm³] be the apparent volume of a unit area (size) of the separator sheet, W [g] be the mass of this separator sheet, and Vb be the ratio between this mass W and the true density ρ [g/cm³] of the resin material making up the separator sheet, i.e., letting Vb be W/ρ, then the porosity H2 of the separator sheet can be calculated from [(Va−Vb)/Va]×100. The porosity H1 [%] of the low porosity regions 36A, 36B can be calculated using H1=100(d2/d1)×(100−H2) from the porosity H2 [%] and the thickness d1 [μm] of the low porosity regions 36A, 36B and the thickness d2 [μm] of the location 35 other than these regions, as obtained with a scanning electron micrograph (SEM).

In a preferred embodiment of the herein disclosed art, the widths $W_A$, $W_B$ of the low porosity regions are suitably at least approximately 2 mm and are preferably at least 5 mm and particularly preferably at least 10 mm. When these widths $W_A$, $W_B$ are too narrow, the curl-inhibiting effect under consideration may be inadequate. When, on the other hand, these widths $W_A$, $W_B$ over which the low porosity regions are disposed are too broad, the unproductive region of the separator sheet is increased and the costs may be driven up. Viewed from the perspective of cost reduction, not more than approximately 40 mm is preferred and, for example, not more than 30 mm is particularly preferred. For example, low porosity regions in which these widths $W_A$, $W_B$ are at least 5 mm but not more than 40 mm (particularly at least 10 mm but not more than 20 mm) are favorable from the perspective of having the curl-inhibiting effect co-exist in good balance with cost reduction. The width $W_A$ of the low porosity region on the winding start end side may be the same as or may differ from the width $W_B$ of the low porosity region on the winding finish end side. The widths $W_A$, $W_B$ of the low porosity regions can be selected as appropriate in conformity to, for example, the conditions of battery use.

In addition, the embodiment described in the preceding uses the example of the disposition of the low porosity regions 36A, 36B on both the winding start end side and the winding finish end side, but there is no limitation to this. A low porosity region may be disposed on only the winding start end side or only the winding finish end side. However, the disposition of the low porosity regions 36A, 36B at both the winding start end side and the winding finish end side, as in the embodiment that has been described in the preceding, is preferred from the standpoint of being able to more favorably stop the problems caused by curling.

Figure 7:
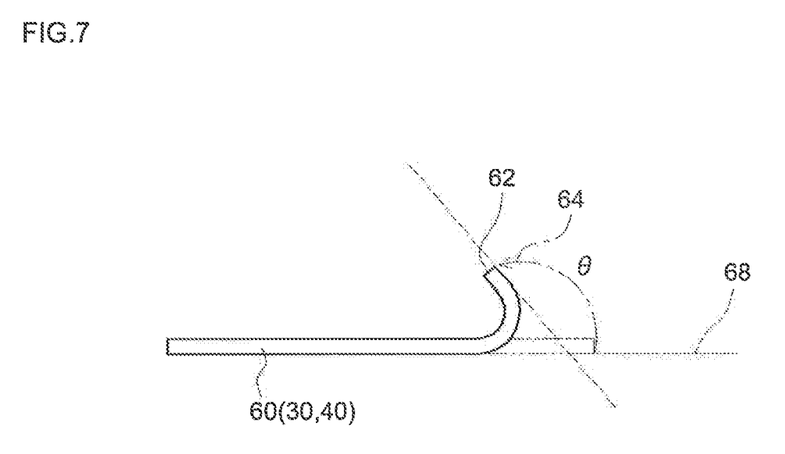
FIG. 7 is a diagram for explaining the amount of curl.

A preferred target for the application of the herein disclosed art can be exemplified by a separator sheet wherein the filler layer 40-bearing separator sheet 30 has the following property, as shown in FIG. 7: when the low porosity regions 36A, 36B of the separator sheet 30 are cut off and removed and the separator sheet is then held for one hour on a horizontal surface 68, the curl angle θ, defined as the angle formed between the horizontal surface 68 and the trajectory 64 described by the tip 62 of the cut end of the sheet 30 that has risen up from the horizontal surface 68, is at least 90° (preferably at least 180°). Because a separator sheet 30 that exhibits such a property is particularly susceptible to curling, the use of the present structure with such a separator sheet 30 is particularly significant.

Methods for forming the filler layer 40 and the low porosity regions 36A, 36B will now be described. A paste (including slurries and inks; this also applies in the following) provided by mixing and dispersing the filler, the binder, and a solvent is used as a filler layer forming paint for forming the filler layer 40. The filler layer 40 can be formed by applying a suitable amount of this paste-form paint to one side of the separator sheet 30 and drying.

The solvent used in this filler layer-forming paint can be, for example, water or a mixed solvent that is mainly water. The solvent other than water used in such a mixed solvent can be one or two or more suitable selections from organic solvents that can be uniformly mixed with water (for example, lower alcohols, lower ketones, and so forth). Or, the solvent used in this filler layer-forming paint may be an organic solvent, e.g., N-methylpyrrolidone (NMP), pyrrolidone, methyl ethyl ketone, methyl isobutyl ketone, cyclohexanone, toluene, dimethylformamide, dimethylacetamide, and so forth, or a combination of two or more of the preceding. The content of the solvent in the filler layer forming paint is not particularly limited, but is preferably 40 to 90 mass % of the paint as a whole and is particularly preferably about 50 mass % of the paint as a whole.

In addition to the filler and binder, this filler layer-forming paint may contain one or two or more materials that can be used on an optional basis. These materials can be exemplified by polymers that can function as thickeners for inorganic filler layer-forming paints. When, in particular, an aqueous solvent is used, the incorporation of a polymer that can function as such a thickener is preferred. Carboxymethyl cellulose (CMC) and polyethylene oxide (PEO) are preferably used as this polymer that can function as a thickener.

The process of mixing the filler and binder into the solvent can be carried out using a suitable mixer, e.g., a Dispermill, Clearmix, FILMIX, ball mill, Homogenizing Disper, ultrasound disperser, and so forth. The filler layer 40 can be formed by coating the filler layer-forming paint on one side of the separator sheet 30 and drying.

The process of coating the filler layer-forming paint on one side of the separator sheet 30 can be implemented in use of any common conventional application means with no limitation thereto. For example, coating can be carried by coating a prescribed amount of the filler layer-forming paint on one side of the separator sheet 30 in a uniform thickness over the entire length in the length direction (from one end to the other end) of the separator sheet 30, using a suitable applicator (for example, a gravure coater, slit coater, die coater, comma coater, and dip coating). The solvent in the filler layer-forming paint is then removed by drying the paint using a suitable drying means (drying is typically carried out at a temperature below the melting point of the separator sheet 30, for example, at or below 110° C., for example, at a temperature of 50 to 80° C.). The filler layer 40 comprising the inorganic filler and the binder can be formed by removing the solvent from the filler layer-forming paint.

After the filler layer 40 has been formed in the described manner on the one side of the separator sheet 30, the low porosity regions 36A, 36B are then formed in the regions of prescribed width from the ends 38A, 38B of the separator sheet toward the sheet center.

There are no particular limitations on the method for forming the low porosity regions 36A, 36B in the separator sheet 30. For example, formation may be carried out by hot compression (pressing) of the regions of prescribed width from the ends 38A, 38B of the separator sheet. At this point, only the separator sheet 30 is selectively compressed based on the relationship between the hardness of the filler layer 40 and the hardness of the separator sheet 30. The low porosity regions 36A, 36B can be conveniently formed in this manner. When the low porosity regions 36A, 36B are formed by hot compression, the heating temperature is preferably a temperature below the melting point of the separator sheet 30 and is generally not more than 180° C. and is preferably approximately 50° C. to 120° C. The pressure may be generally approximately 0.1 MPa to 2 MPa. The treatment time may be generally approximately 0.5 seconds to 3 seconds. The execution of hot compression (pressing) under these conditions can prevent the separator sheet from melting and solidifying. A pressing operation at normal temperature (without the application of heat) may be performed as necessary.

Or, another process for reducing the porosity may be carried out instead of the hot compression (pressing). For example, the porosity may be reduced by filling a resin into the pores of the separator sheet. There are no particular limitations on the resin used to effect this filling. It may be, for example, the resin that constitutes the separator sheet 30 (for example, PE) or may be a resin that can also function as a binder, e.g., polyvinylidene fluoride (PVdF). The low porosity regions 36A, 36B can be formed by dispersing this resin in a suitable solvent followed by application to (impregnation into) the regions of prescribed width from the ends 38A, 38B of the separator sheet and drying. Formation of the low porosity regions 36A, 36B may be carried out after the formation of the filler layer 40 as described above or may be carried out before the formation of the filler layer 40.

Once the low porosity regions 36A, 36B have been formed in the described manner in the prescribed regions of the separator sheet 30, two of the separator sheets 30 are stacked as shown in FIG. 3 with a separately prepared positive electrode sheet 10 and negative electrode sheet 20. When this is done, stacking is carried out with the positive electrode sheet 10 and the negative electrode sheet 20 shifted somewhat in the width direction so the positive electrode active material layer-free region on the positive electrode sheet 10 and the negative electrode active material layer-free region on the negative electrode sheet 20 extend, respectively, from the two sides, in the width direction, of the separator sheet 30. In addition, the separator sheet 30 sandwiched between the positive electrode sheet 10 and the negative electrode sheet 20 is disposed so the filler layer 40 formed on the one side of the separator sheet 30 faces the positive electrode sheet 10. In addition, the separator sheet 30 stacked to the lower side of the negative electrode sheet 20 is disposed such that the filler layer 40 formed on the one side of the separator sheet 30 faces away from the negative electrode sheet 20. A wound assembly can be fabricated by stacking the separator sheet 30, negative electrode sheet 20, separator 30, and positive electrode sheet 10 in this manner and winding these sheets in the length direction while applying tension to each sheet. A flat wound electrode assembly 80 can then be fabricated by flattening this wound assembly from the side direction.

In addition, as shown in FIGS. 1 and 2, the wound electrode assembly 80 is introduced into the case main body 52 through the open upper end of this main body 52 and an electrolyte comprising a suitable supporting salt is also disposed (filled) into the case main body 52. The supporting salt is, for example, a lithium salt such as $LiPF_6$. An electrolyte (typically a liquid electrolyte, i.e., an electrolyte solution) can be used as provided by the dissolution of a suitable quantity (for example, a concentration of 1 M) of a lithium salt such as $LiPF_6$ in a mixed solvent of ethylene carbonate, ethyl methyl carbonate, and dimethyl carbonate (in, for example, a mass ratio of 3:4:3).

The assembly of the lithium secondary battery 100 according to this embodiment is subsequently completed by sealing the opening with the lid 54, for example, by welding. The process for sealing the battery case 50 and the process of electrolyte introduction (filling) may be the same as in the fabrication of conventional lithium secondary batteries and are not characteristic features of the present invention. Proceeding in this manner completes the fabrication of the lithium secondary battery 100 according to the present embodiment.

Test examples for the present invention are presented below, but this should not be construed as limiting the present invention to that which is shown in these test examples.

<Formation of the Filler Layer>

A filler layer-forming paint was prepared in this example by mixing α-alumina powder (average particle diameter (D50)=0.7 μm) as the inorganic filler and PVdF as the binder in NMP at a mass ratio among these materials of 9:6:4. This filler layer-forming paint was coated using a gravure roll on a prescribed region on one side of a separator sheet (porous PE was used that had a thickness of 18 μm and a porosity of 50%), and drying then provided a separator sheet that had a filler layer formed on one side of the separator sheet. A total of three samples (separator sheets 1 to 3) having different average thicknesses for the filler layer were prepared in this example. The average thickness of the filler layer in each sample is shown in Table 1.

<Measurement of the Curl Angle>

Test specimens with a width of 6 cm and a length of 10 cm were taken from the separator sheets 1 to 3 obtained as described above and were held at quiescence on a horizontal surface. The curl angle (°) was measured on the test specimen after the elapse of one hour. As shown in FIG. 7, this curl angle is defined as the angle θ formed, after the test specimen 60 has been allowed to stand for one hour on the horizontal surface 68, between the horizontal surface 68 and the trajectory 64 described by the tip 62 of the cut end of the test specimen 60 that has risen up from the horizontal surface 68. The results are given in Table 1.

TABLE 1

|  | filler layer thickness | curl angle |
| --- | --- | --- |
| separator sheet 1 | 8 μm | 10° |
| separator sheet 2 | 5 μm | 90° |
| separator sheet 3 | 2 μm | ≧180° |

Of these separator sheets 1 to 3, a wound electrode assembly was fabricated using separator sheet 3, which had a curl angle in excess of 180°. The fabrication of this wound electrode assembly was carried out as follows, Example 1

The low porosity regions were formed by hot compression, using a hot press (roll press) regulated to 120° C., of regions having a prescribed width from both ends in the length direction of the separator sheet 3 toward the sheet center. The width of the low porosity regions was approximately 2 mm. The porosity reduction percentage X for these low porosity regions was calculated to be approximately 40% using the previously described formula $X=[(H2-H1)/H2] \times 100$.

<Fabrication of the Positive Electrode Sheet>

An aluminum foil (positive electrode current collector) was prepared and the positive electrode sheet was fabricated by forming a positive electrode active material layer (a layer containing 85 mass % lithium nickel cobalt manganate ($LiNi_{1/3}Co_{1/3}Mn_{1/3}O_2$) as the positive electrode active material, 10 mass % AB as an electroconductive material, and 5 mass % PVdF as a binder) on a prescribed region on the surface of the aluminum foil using a common method.

<Fabrication of the Negative Electrode Sheet>

A copper foil (negative electrode current collector) was prepared and the negative electrode sheet was fabricated by forming a negative electrode active material layer (a layer containing 98 mass % graphite as the negative electrode active material, 1 mass % SBR as a binder, and 1 mass % CMC as a thickener) on a prescribed region on the surface of the copper foil using a common method.

<Production of the Wound Electrode Assembly>

The positive electrode sheet and the negative electrode sheet were stacked and wound with two separator sheets interposed therebetween. When this was done, the separator sheet sandwiched between the positive electrode sheet and the negative electrode sheet was disposed so the filler layer formed on the one surface of the separator sheet faced the positive electrode sheet. On the other hand, the separator sheet stacked to the lower side of the negative electrode sheet was disposed so the filler layer formed on the one side of the separator sheet faced away from the negative electrode sheet. This stack was then wound and the resulting wound assembly was pressed from the side direction to produce a flat wound electrode assembly.

Example 2

A wound electrode assembly was fabricated proceeding as in Example 1, but using 5 mm for the width of the low porosity regions on the separator sheet.

Example 3

A wound electrode assembly was fabricated proceeding as in Example 1, but using 10 mm for the width of the low porosity regions on the separator sheet.

Example 4

A wound electrode assembly was fabricated proceeding as in Example 1, but using 20 mm for the width of the low porosity regions on the separator sheet.

Comparative Example 1

A wound electrode assembly was fabricated proceeding as in Example 1, but without placing the low porosity regions in the separator sheet.

Comparative Example 2

A wound electrode assembly was fabricated proceeding as in Example 1, but using the separator sheet 2 and without placing the low porosity regions in the separator sheet.

<Evaluation>

Ten of the flat wound electrode assemblies according to each example were fabricated and were visually checked for the presence/absence of separator crimping (curl kinking, height differences). These results are given in Table 2.

TABLE 2

| | width of the low porosity regions (mm) | porosity reduction percentage X (%) | rate of crimping occurrence (%) |
|---|---|---|---|
| Comparative Example 1 | 0 | 0 | 100 |
| Comparative Example 2 | 0 | 0 | 60 |

TABLE 2-continued

| | width of the low porosity regions (mm) | porosity reduction percentage X (%) | rate of crimping occurrence (%) |
|---|---|---|---|
| Example 1 | 2 | 40 | 40 |
| Example 2 | 5 | 40 | 10 |
| Example 3 | 10 | 40 | 0 |
| Example 4 | 20 | 40 | 0 |

As shown in Table 2, crimping was produced in all of the wound electrode assemblies in Comparative Example 1, which lacked low porosity regions in the separator sheet. On the other hand, in Examples 1 to 4, in which low porosity regions were placed in regions of prescribed width from the ends of the separator sheet, the appearance of crimping was inhibited in comparison to Comparative Example 1. With the wound electrode assemblies tested here, the rate of crimping occurrence was reduced to 10% or less by having the width of the low porosity region be 5 mm or more. In particular, the appearance of crimping was prevented in all the wound electrode assemblies by having the width of the low porosity region be 10 mm or more. In Comparative Example 2, which used separator sheet 2 that had a smaller curl angle than separator sheet 3, the rate of crimping occurrence held at 60% even though a low porosity region was not placed in the separator sheet. Based on this, it could be confirmed that the effects due to the structure of the present invention could be expressed particularly well with separator sheets for which the curl angle exceeded 90°.

A total of four types of flat wound electrode assemblies were fabricated (Examples 5 to 8) holding the width of the low porosity regions constant at 10 mm as in Example 3 while varying the porosity reduction percentage X among the types as shown in Table 3; ten of each type of flat wound electrode assembly were fabricated. The wound electrode assemblies were fabricated proceeding as in Example 3, but changing the porosity reduction percentage X as in Table 3. The presence/absence of separator crimping (curl kinking, height differences) was visually checked. These results are given in Table 3.

TABLE 3

| | width of the low porosity regions (mm) | porosity reduction percentage X (%) | rate of crimping occurrence (%) |
|---|---|---|---|
| Comparative Example 1 | 0 | 0 | 100 |
| Example 5 | 10 | 5 | 30 |
| Example 6 | 10 | 15 | 10 |
| Example 3 | 10 | 40 | 0 |
| Example 7 | 10 | 65 | 0 |
| Example 8 | 10 | 90 | 0 |

As shown in Table 3, the rate of crimping occurrence declined as the porosity reduction percentage increased. With the wound electrode assemblies tested here, the rate of crimping occurrence could be reduced to 10% or less by having the porosity reduction percentage be 15% or more. In particular, crimping could be prevented in all the wound electrode assemblies by having the porosity reduction percentage be 40% or more. Based on these results, the porosity reduction percentage is favorably generally at least 5% (for example, from at least 5% to not more than 90%) and is preferably at least 10% (for example, from at least 10% to not more than 90%), more preferably at least 15% (for example, from at least 15% to not more than 90%), and particularly preferably at least 40% (for example, from at least 40% to not more than 90%).

The present invention has been described in the preceding using suitable embodiments, but this description is not limiting and various modifications are clearly possible. For example, the battery type is not limited to the lithium secondary battery described in the preceding and may be any of variously formulated batteries having different electrolytes and different materials for the electrode assembly, for example, nickel hydride batteries, nickel-cadmium batteries, and electric double-layer capacitors, Moreover, as long as the herein disclosed separator sheet having a filler layer formed on one side is used, there are no particular limitations on the shape (external shape and size) of the nonaqueous electrolyte secondary battery that is fabricated. The outer enclosure may be a thin sheet type constructed of, for example, a laminate film, or the battery may have a cylindrical or rectangular parallelepiped-shaped battery outer case, or a small button shape may be used.

In addition, the embodiments described in the preceding concern examples in which the filler layer is formed on the positive electrode sheet side of the separator sheet, but there is no limitation to this. The filler layer may be disposed on the negative electrode sheet side.

Figure 8:
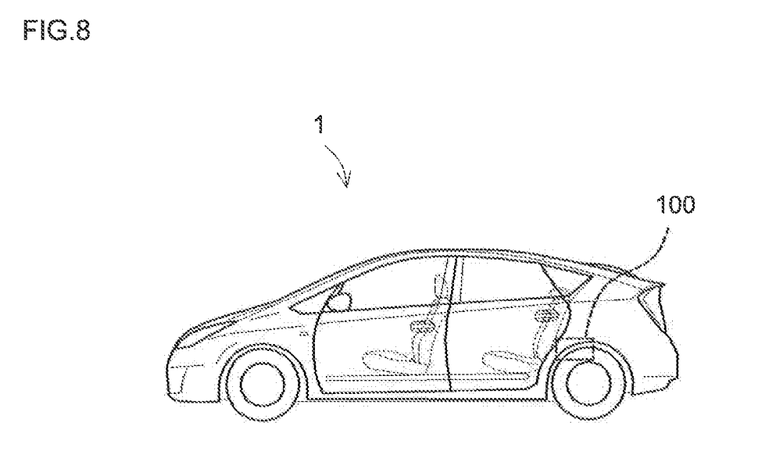
FIG. 8 is a side view that illustrates a vehicle in which a battery is mounted.

All of the herein disclosed nonaqueous electrolyte secondary batteries 100 are provided with a performance that is well adapted (for example, excellent cycle characteristics can be obtained) for application as a vehicle-mounted battery. Accordingly, the present invention provides, as shown in FIG. 8, a vehicle 1 that is equipped with any of the herein disclosed nonaqueous electrolyte secondary batteries 100, in particular, a vehicle 1 (for example, an automobile) is provided in which this nonaqueous electrolyte secondary battery 100 is disposed as a drive power source (typically a drive power source for a hybrid vehicle or an electric vehicle).

INDUSTRIAL APPLICABILITY

The structure of the present invention can provide a nonaqueous electrolyte secondary battery in which the defects caused by curling can be extinguished.

The invention claimed is:

1. A nonaqueous electrolyte secondary battery provided with a wound electrode assembly in which a positive electrode sheet and a negative electrode sheet are wound, with a porous separator sheet interposed therebetween, wherein a filler layer having an inorganic filler and a binder is formed on one surface of the separator sheet,
the filler layer is continuously disposed from a winding start end to a winding finish end of the sheet in the winding direction of the separator sheet, and
the separator sheet has a low porosity region, which has a porosity lower than at a location outside this region, in a region having a prescribed width from the winding start end and/or from the winding finish end of the sheet toward the center of the sheet.

2. The nonaqueous electrolyte secondary battery according to claim 1, wherein the low porosity region is formed by a compression of the region having a prescribed width from the end of the separator sheet.

3. The nonaqueous electrolyte secondary battery according to claim 1, wherein the porosity reduction percentage X given by formula (1) is $5 \leq X \leq 90$ where H1 is the porosity of the low porosity region of the separator sheet and H2 is the porosity at a location outside this region:

$$X=[(H2-H1)/H2]\times 100 \qquad (1).$$

4. The nonaqueous electrolyte secondary battery according to claim 1, wherein the width of the low porosity region is 2 mm to 40 mm.

5. The nonaqueous electrolyte secondary battery according to claim 1, wherein the thickness of the filler layer is not more than 5 μm.

6. The nonaqueous electrolyte secondary battery according to claim 1, wherein the inorganic filler comprises at least one inorganic compound selected from the group consisting of alumina, magnesia, zirconia, silica, boehmite, and titania.

7. The nonaqueous electrolyte secondary battery according to claim 1, wherein the wound electrode assembly is a flat wound electrode assembly.

8. The nonaqueous electrolyte secondary battery according to claim 1, wherein the filler layer-bearing separator sheet has the following property:

when the low porosity region of the separator sheet is cut off and removed and the separator sheet is then held for one hour on a horizontal surface, the curl angle, defined as the angle formed between the horizontal surface and the trajectory described by the tip of the cut end of the sheet that has risen up from the horizontal surface, is at least 90°.

* * * * *